US009137297B2

(12) United States Patent
Kim et al.

(10) Patent No.: US 9,137,297 B2
(45) Date of Patent: Sep. 15, 2015

(54) INFORMATION MANAGEMENT SYSTEM FOR HOME APPLIANCE

(75) Inventors: Yanghwan Kim, Changwon-si (KR); Hyoungjun Park, Changwon-si (KR); Jonghoon Shim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 13/983,223

(22) PCT Filed: Aug. 13, 2012

(86) PCT No.: PCT/KR2012/006437
§ 371 (c)(1),
(2), (4) Date: Aug. 1, 2013

(87) PCT Pub. No.: WO2013/027955
PCT Pub. Date: Feb. 28, 2013

(65) Prior Publication Data
US 2013/0311610 A1    Nov. 21, 2013

(30) Foreign Application Priority Data
Aug. 19, 2011   (KR) .......................... 10-2011-0083045

(51) Int. Cl.
*H04L 29/08*    (2006.01)
*H04L 12/28*    (2006.01)

(52) U.S. Cl.
CPC ............ *H04L 67/10* (2013.01); *H04L 12/2818* (2013.01); *H04L 12/2825* (2013.01)

(58) Field of Classification Search
CPC ...................................................... H04L 67/10
USPC ........................................................ 709/217
See application file for complete search history.

(56) References Cited

U.S. PATENT DOCUMENTS

| 5,960,402 A * | 9/1999 | Embutsu et al. ............... 705/308 |
| 5,963,449 A * | 10/1999 | Ota et al. ....................... 700/112 |
| 7,620,703 B1 * | 11/2009 | Shteyn .......................... 709/220 |
| 2003/0009383 A1 * | 1/2003 | Mori et al. ....................... 705/22 |
| 2003/0060978 A1 * | 3/2003 | Kokojima et al. ............. 701/211 |
| 2003/0069745 A1 * | 4/2003 | Zenko ................................ 705/1 |
| 2004/0015406 A1 * | 1/2004 | Kamada et al. .................. 705/26 |
| 2005/0033957 A1 * | 2/2005 | Enokida ......................... 713/156 |
| 2005/0055641 A1 * | 3/2005 | Machida ........................ 715/734 |
| 2005/0131991 A1 * | 6/2005 | Ogawa et al. .................. 709/201 |
| 2005/0184852 A1 * | 8/2005 | Lee ............................... 340/3.1 |

(Continued)

FOREIGN PATENT DOCUMENTS

| KR | 10-2007-0049478 A | 5/2007 |
| KR | 10-2009-0040426 A | 4/2009 |

(Continued)

*Primary Examiner* — O. C. Vostal
(74) *Attorney, Agent, or Firm* — Dentons US LLP

(57) ABSTRACT

The present invention relates to information management systems for a home appliance, and more particularly, to an information management system for a home appliance which is embodied to enable to communicate between the home appliance and a server system for providing information a user requires, quickly. The information management system for a home appliance includes a home appliance having a predetermined ID, and a server system having the ID of the home appliance recorded thereon, and provided to be able to communicate with the home appliance for transmitting/receiving predetermined information with the home appliance upon request from the home appliance with the ID recorded thereon, already.

10 Claims, 15 Drawing Sheets

(56) References Cited

U.S. PATENT DOCUMENTS

| | | | |
|---|---|---|---|
| 2007/0151300 A1* | 7/2007 | Sunshine | 68/3 R |
| 2009/0124376 A1* | 5/2009 | Kelly et al. | 463/29 |
| 2010/0271746 A1* | 10/2010 | Pelrine et al. | 361/234 |
| 2011/0007901 A1* | 1/2011 | Ikeda et al. | 380/270 |
| 2011/0015797 A1* | 1/2011 | Gilstrap | 700/291 |
| 2011/0046792 A1* | 2/2011 | Imes et al. | 700/278 |
| 2011/0105041 A1* | 5/2011 | Maruyama | 455/66.1 |
| 2011/0138058 A1* | 6/2011 | Ishida | 709/227 |
| 2011/0184575 A1* | 7/2011 | Kawamoto et al. | 700/292 |
| 2011/0184586 A1* | 7/2011 | Asano et al. | 700/297 |
| 2011/0312278 A1* | 12/2011 | Matsushita et al. | 455/66.1 |
| 2012/0136478 A1* | 5/2012 | Anand et al. | 700/237 |

FOREIGN PATENT DOCUMENTS

| KR | 10-2010-0020285 A | 2/2010 |
|---|---|---|
| KR | 10-2011-0019678 A | 2/2011 |

* cited by examiner (a)

(b)

(a)

(b)

(a)

(b)

(a)

(b)

(a)

(b)

INFORMATION MANAGEMENT SYSTEM FOR HOME APPLIANCE

This application is a 35 USC §371 National Stage entry of International Application No. PCT/KR2012/006437 filed Aug. 13, 2012, and claims priority of Korean Application No. 10-2011-0083045 filed Aug. 19, 2011, which are hereby incorporated by reference in its entirety.

TECHNICAL FIELD

The present invention relates to information management systems for a home appliance, and more particularly, to an information management system for a home appliance which is embodied to enable to communicate between the home appliance and a server system for providing information a user requires, quickly.

BACKGROUND ART

The home appliance in a home performs a function of each of the home appliances, such as a refrigerator, a washing machine, and an air conditioner to provide convenience to a user.

Currently, the home appliances in the home form, so called 'Home Network' in which the home appliances are connected with one network, enabling the user to control the home appliance in the home through the home network, remotely.

With this, even if the user is out of the home, the user can turn on/off the home appliance, or control the function of the home appliance.

However, the home appliance control through the home network has a limitation that the control can not but be limited to an original function of the home appliance.

Currently, though home appliances which provide convenient functions other than the original functions of the home appliances come to market places according to a trend that the home appliances in the home are changed to be smart, since the home appliances provide additional functions individually without joining to the home network, the home appliances have a problem in that the home appliances have a limitation in creation of a synergy effect together with other home appliances.

DISCLOSURE OF INVENTION

Technical Problem

To solve the problems, an object of the present invention is to provide an information management system for a home appliance in which communication is established between the home appliance and a server system to enable to transmit/receive different pieces of information and different kinds of signal for enhancing user's convenience.

Solution to Problem

To achieve these objects and other advantages and in accordance with the purpose of the invention, as embodied and broadly described herein, an information management system for a home appliance, includes a home appliance having a predetermined ID, and a server system having the ID of the home appliance recorded thereon, the server system provided to be able to communicate with the home appliance for transmitting/receiving predetermined information with the home appliance upon request from the home appliance with the ID recorded thereon, already.

Advantageous Effects of Invention

The selection of a kind of the laundry by using an icon that indicates the laundry by having an optimal washing course recommended according to the selection of the laundry enhances user's information accessibility and convenience of use.

The inclusion of a step for evaluation of the washing course recommended thus permits consistent improvement of the function of the washing course based on the evaluation step.

The availability of remote diagnosis on fault of the home appliance permits convenient after service.

The fast transmission of firmware or drive program update from the server system to the home appliance permits consistent update.

And, an electric charge can be saved by providing power information from the server.

If the home appliance is installed abroad, and civil power enterpriser supplies power, since a language to be used and a power company to be used can be set automatically, without setting the language to be used and the power company to be used one by one, user's convenience is enhanced.

And, in case of abandonment of the home appliance, the abandonment and collection application done by communication between the server and the user permits saving in expense and time required for the abandonment and collection of the home appliance.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Figure 1:
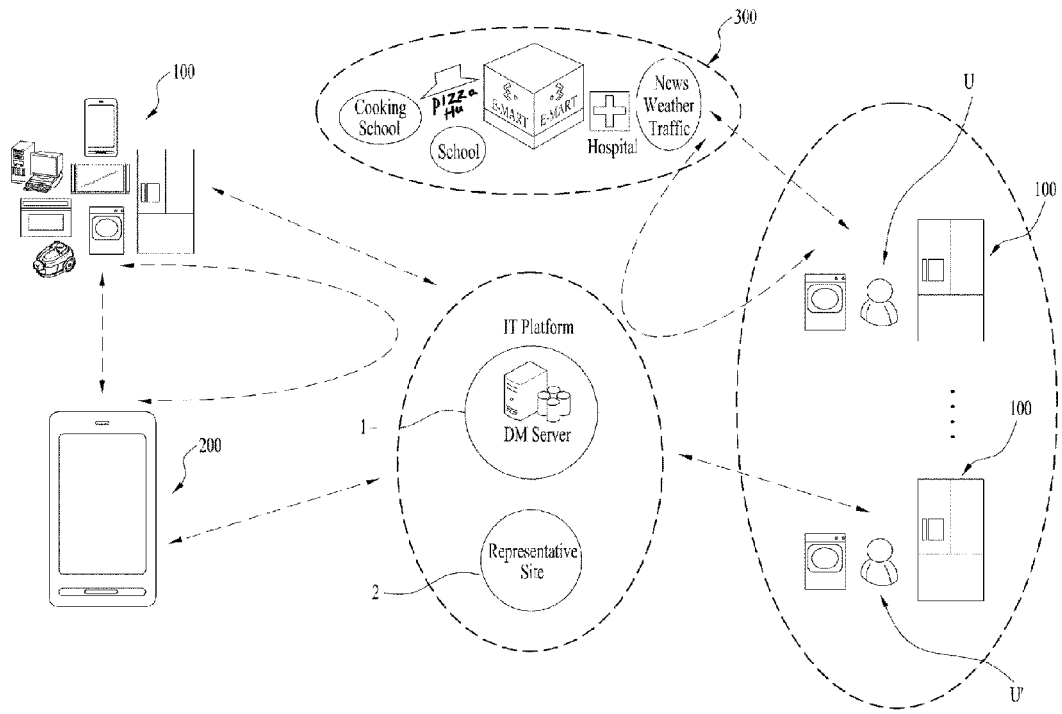
FIG. 1 illustrates a schematic view of the present invention.

Reference will now be made in detail to the specific embodiments of the present invention, examples of which are illustrated in the accompanying drawings. Wherever possible, the same reference numbers will be used throughout the drawings to refer to the same or like parts.

Provided at a center of an information management systems for a home appliance of the present invention, there are a server system 1 for registering and storing registration information and user information of home appliances provided to a home, and the like, and a representative site 2 provided to be able to communicate with the server system 1 for enabling a user to provide user's information and registration information on the home appliances by writing to the server system.

And, the server system 1 is provided to be able to communicate with other elements around the server system 1.

At first, the server system 1 is connected to home appliances 100 provided to homes and offices for providing information requested through the home appliances 100, or providing firmware or other management software toward the home appliances 100.

It is preferable that the home appliances 100 in communication with the server system 1 have device IDs, respectively.

In the meantime, if the home appliances 100 provided to be able to communicate with the server system 1 exist two or more than two at one place (Home or Office), the two or more than two home appliances 100 are provided, not only to communicate with the server system 1 to transmit/receive information, but also communicate with one another.

With this, information generated or managed at one home appliance 100 is transmitted to other home appliances 100, to share the information in common. Moreover, information inputted to or generated by one home appliance 100 may be displayed on a display of other home appliance 100.

In the meantime, the server system 1 is provided to be able to communicate with a wireless terminal 200 the user owns. The wireless terminal 200 may be, but not limited to, a smart phone, a tablet PC, and so on which can access to the Internet.

The wireless terminal 200 is also provided with a unique device ID the same as the home appliance, and can communicate with the server system 1 by passing a mutual certification procedure with the server system 1. By communication between the wireless terminal 200 and the server system 1, remote control and remote information management on the home appliance 100 provided at remote places (Home and office) becomes possible.

Therefore, information or a signal inputted to or managed by the wireless terminal 200 may be transmitted to the home appliance 100 provided at the remote place through the server system 1 or the Internet network, and displayed or stored at the home appliance.

And, information, or a signal generated, or managed by the home appliance 100 may be provided to the wireless terminal 200 through the server system 1 or the Internet network.

In the meantime, as information or signal exchange is made possible between the wireless terminal 200 and the server system 1, firmware or software upgrade or update from the server system 1 toward the wireless terminal 200 is possible automatically or if there is request from a wireless terminal 200 side.

Besides connection of the server system 1 to the home appliance or the smart phone, the server system 1 may be connected to an outside service provider 300, for enabling the outside service provider 300 to provide information or signals or programs to the user.

That is, the server system 1 can provide passage service in which the server system 1 is connected to shopping centers, private educational institutes, schools, hospitals, and broadcasting stations to provide information such enterprises provide to the home appliances 100 or the wireless terminal 200 the users use.

That is, if there is request for service a particular outside enterpriser provides through the home appliance 100 certified by the server system 1, the server system 1 serves as a medium which provides the user information or the home appliance information to the outside enterpriser 300 and, in turn, provides necessary information to the user.

With such service, the user may have shopping service, living information, medical information, and so on provided thereto remotely, and the outside enterpriser 300 may obtain the user information through the server system 1 under agreement of the user, and may perform advertisement or service guide suit to the information obtained thus.

In the meantime, through intermediation of the server system, the particular user U may exchange information or a signal with other user U'.

That is, if the particular user U intends to generate or manage predetermined information by using an input unit and a display unit at a particular home appliance 100, and share the information with other user U' in common, the particular user may provide the information to other user U' while the particular user manage the information with the server system 1.

That is, in a case the information is provided among users certified by the server system 1, by showing his (Her) own exercise information, health information, recipe information, and so on to other users, friendship may be cultivated, or motivation on exercise or health management may be provided among the users.

Figure 2:
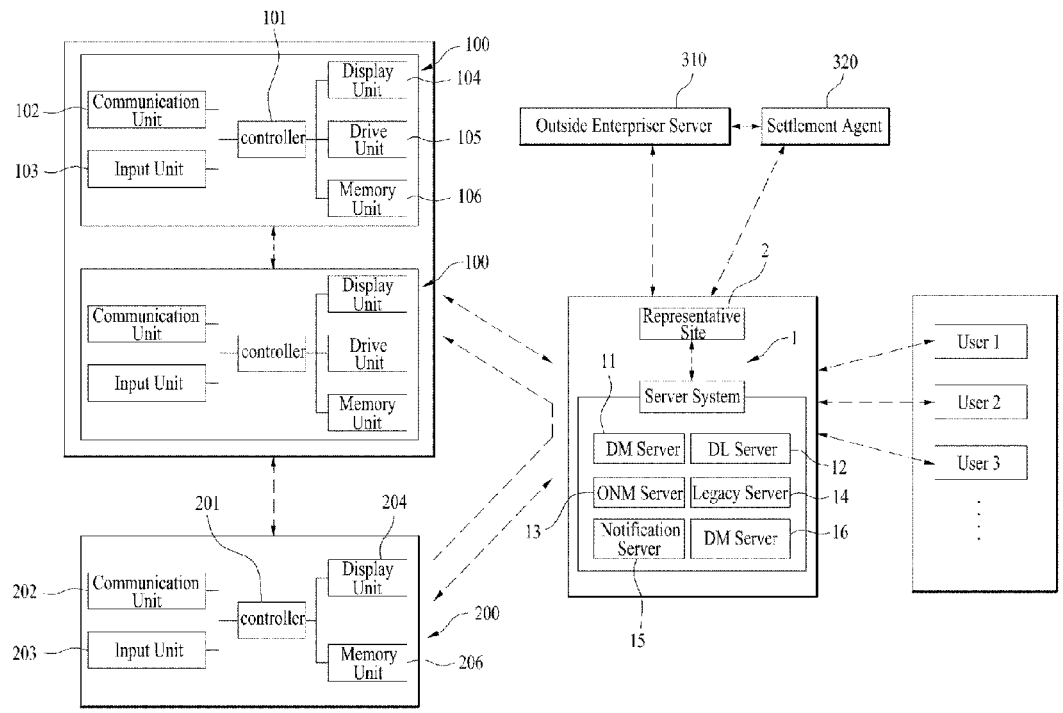
FIG. 2 illustrates a block diagram of control of the present invention.

Referring to FIG. 2, in a plurality of the home appliances 100 which belongs to a user, each of the home appliances 100 includes a controller 101, a communication unit 102, an input unit 103, a display unit 104, a operation unit 105, and a memory unit 106.

In this instance, the communication unit 102 serves as an interface for communicating with the server system 1, or a communication unit of other home appliance, or a communication unit 202 of the wireless terminal 200.

The input unit 103 is provided in a form of a button or a touch pad for the user to input information thereto, and the display unit 104 visualizes information transmitted from an outside or the user manages for the user to watch.

The operation unit 105 is a part for performing an original function according to characteristic of the home appliance. That is, if the home appliance is a refrigerator, a compressor, a cooling fan, and so on are the operation unit, and, if the home appliance is a washing machine, a operation motor, or a water supply valve may form the operation unit.

The memory unit 106 stores information the user manages or provided from an outside.

The wireless terminal 200 also includes a controller 201, a communication unit 202, an input unit 203, and a memory unit 206, and functions of which are similar to the same of the home appliance, and description of the same will be omitted for preventing repetitive description.

In the meantime, the server system 1 may be connected to an outside enterpriser server 310 for exchanging information, and provide the information to the home appliance 100 of the user.

And, in a case of service which requires settlement of accounts, such as shopping, the server 1 is provided to be able to communicate with an outside settlement agent for assisting to make progress of the service smooth.

In the meantime, the server system 1 is provided such that a plurality of users can access thereto at a time for exchange information among them. The drawing shows the plurality of users as a user 1 U1, a user2 U2, user3 U3, and so on, wherein the users exchange information to other users through the home appliance 100, the wireless terminal 200, and so on.

That is, elements of the home appliance or elements of the wireless terminal each of the users has are identical or similar to the elements of the home appliance (The controller 101, the communication unit 102, the input unit 103, the display unit 104, the operation unit 105, and the memory unit 106) or the elements of the wireless terminal 200 (The controller 201, the communication unit 202, the input unit 203, the display unit 204, and the memory unit 206).

The server system 1 may have the device ID and the characteristic information (For an example, product kind, model information, and so on) of the home appliance together with the user ID registered thereto.

In this instance, though the device ID may be made regardless of the characteristic information of the product, such as the product kind, and the model information, the device ID may be encoded together with the characteristic information of the product.

Accordingly, the server system 1 may be made to perceive the product kind, or the model information of the product with reference to the device ID only.

The user may request service through the home appliance and may have service of the home appliance 100 on the home appliance 100 registered to the server system 1.

For an example, if the user selects and inputs a desired service through the display window of the refrigerator, the refrigerator can request the service to the server system 1 by communication with the server system 1.

There may be necessity that the user's service request is made possible through means other than the home appliance for making the user's service request more convenient and extension of management service items on the home appliance 100.

If the user accesses to the server system 1 through the home appliance 100, though the server system 1 can specify a service object as the user accesses to the server system 1 through a unique account of the home appliance 100 or the wireless terminal 200, if the user accesses to the server system 1 not through the home appliance 100, it may be necessary to fix how to specify a service objective home appliance 100.

As an example, the user may access to the representative site 2 for requesting the service by inputting the device ID of the home appliance 100 the user desires to have the service provided thereto.

However, in this case, there is inconvenience of remembering entire device IDs of the home appliances 100 the user owns.

The representative site 2 may be made to resolve such inconvenience. The user may signup to the representative site 2 and have the user ID and password given to the user.

The user may log-in the representative site 2 and register all the home appliances 100 the user owns thereto.

The home appliances 100 registered to the representative site may be registered to the server system 1 together with the user ID.

This may be done by automatic transmission of the information from the representative site 2 to the server system 1.

Moreover, the registration of the home appliances 100 to the server system 1 described before may also be made with an activation procedure to be described later.

In any case, if the user has the ID issued thereto, the ID may be registered to, and managed by, the server system 1, together with the home appliances 100 of the user.

The service request received from the user through the representative site 2 may be performed as a manager gives an order to the server system 1 on relevant management service.

Or, the representative site 2 may be connected to the server system 1 through an open API, when the user can make management service request to the server system 1 directly through the representative site 2.

The server system 1 has a server side protocol provided thereto for the management service, wherein the server side protocol performs the management service requested thus in interrelation with a client side protocol of the product.

As a protocol for performing the management service between the server system 1 and the home appliance 100, an OMA DM protocol may be used.

Of course, not the OMA DM, but other solution may be used. Though the embodiment suggests using the OMA DM protocol, the present invention is not limited to this.

The management service may have the following management details.

Bootstrap: In order to perform an initial management session, a DM (Device Management) client of the home appliance 100 or the wireless terminal 200 needs certification information with a DM (Device Management) server, and network setting information for connection to the network. A step for above is called as Bootstrap.

Provisioning: The home appliance 100 or the wireless terminal 200 which initially performs the management session is registered to the DM (Device Management) server system with the Bootstrap, and configuration of the home appliance 100 or the wireless terminal 200 is updated to a latest one for providing the service to the home appliance 100 or the wireless terminal 200.

A step for above is called as Provisioning.

Configuration Management: Management work for referring to, or changing home appliance 100 or wireless terminal 200 related setting information, or setting, referring to or changing service related information is called as Device configuration management.

Control Management: Management work for controlling the home appliance 100 or the wireless terminal 200 is called as Control Management.

User Alert: By providing an alert signal to the DM (Device Management) client, the DM (Device Management) server may inform detail of the management work to the user, or obtain permission from the user through a frame of a terminal. That is, by interaction with the user, improved management work is possible.

Diagnostic and Monitoring: During the user uses the home appliance 100 or the wireless terminal 200, the home appliance 100 or the wireless terminal 200 may cause poor performance or malfunction.

The server system is required to perceive such a state in advance, and provide a secure product use environment to the user by taking an action proper to the state perceived thus. Such work is called as diagnostic and monitoring.

Firmware Update Management: Management work performed in a case a trouble, a functional change, or updating of firmware takes place at a terminal after sold by a manufacturer.

Software Component Management: Management work performed for installing, updating, or erasing a software component from the terminal.

Backup and Restore Management: Management work performed for backingup/restoring data on the terminal to the DM server.

In the meantime, the server system 10 may be installed distributed to many places in view of positions thereof. For an example, a server system 1 may be installed in Korea and a server system 2 may be installed in the USA.

And, the server system may be separated into a plurality of servers according to services of the servers.

The Server system may have, but not limited to, the following configuration.

<DM Server>

The DM Server 11 provides a service of giving a terminal management order to the DM client of the home appliance 100 or the wireless terminal 200. In this instance, the DM client is an element which performs functions related to product management in detail of the functions of the communication unit 102 or 202 of the home appliance 100 or the wireless terminal 200.

That is, by means of the management order, the DM Server 11 provides a management function of processing firmware update (Modem firmware/OS) management work, software management work, diagnostic management work, and so on, remotely.

The DM Server 11 may include a Session Management region, a Security Management region, a DM Protocol Process region, and a SyncML Protocol Engine region.

<DL Server>

The DL server transmits a file to the DL client of the home appliance 100 or the wireless terminal 200.

That is, the DL server 11 provides a function in which the DL server 11 transmits information on the file intended to transmit through a DD (Download Descriptor), for the DL client to download the file, exactly.

In this instance, the DL client is an element for performing a function related to download of the functions of the communication unit 102 or 202 of the home appliance 100 or the wireless terminal 200 in detail.

In the files downloaded thus, there are a firmware update package and a software management package. The DL server may include a Session Management region, a Package Management region, and a Download region.

<ONM Server or User Portal>

The ONM Server 13 provides a service of interfacing with the DM server 11, or the DL server 12 and the Legacy server 14 to be described later, and embodying a business logic.

The manager may give a management order, or refer to management information, through a management web page of the ONM Server 13.

The User Portal provides some of the functions of the ONM Server 13 to the user.

In this instance, the functions of the ONM Server 13 are embodied through the open API of the DM Server 11. The user may request the management service to the DM Server through the user portal.

<Legacy Server>

In Representative Legacy Servers 14 the ONM Server 13 is interrelated thereto, there are a server for receiving home appliance 100 or the wireless terminal 200 information and a server for receiving user information.

That is, the legacy servers 14 transmit the user information or the home appliance 100 or the wireless terminal 200 information to the ONM Server 13 for providing information to embody the business logic.

<Notification Server>

The notification server 15 transmits a notification message from the DM server 11 to the home appliance 100 or the wireless terminal 200.

The notification server 15 may include a Session Generation region, and a Schedule Management region.

If the home appliance 100 or the wireless terminal 200 is in a private network, in order to maintain connection to the home appliance 100 or the wireless terminal 200, a Connection Manager may be required, which is specially provided to a server side.

The home appliance 100 or the wireless terminal 200 may request a TCP connection after booted automatically, and the connection manager maintains the TCP connection requested thus. The DM Server 11 transmits the notification message through this.

The Notification server 15 is provided to be able to communicate with the wireless terminal 200 or the home appliance 100 of the user, for informing to the user if information on the home appliance 100 (Stored goods management information, a shopping wish list, goods purchase finish information, account settlement information) is changed.

<Open API>

An application at a wireless terminal, such as a smart phone, may manage terminals through the open API provided by the DM Server, remotely.

In the meantime, the server system 1 may include a data base server 16.

The data base server 16 may contain a user information data base having personal information of the users recorded thereon who signed up to the representative site each to have an ID.

The user information data base may have user's personal information (Name, address, telephone number, and so on) recorded thereon, and information on the home appliance (A number thereof the user owns, and kinds of the home appliances) recorded thereon.

Details and a procedure of the management service will be described.

Figure 3:
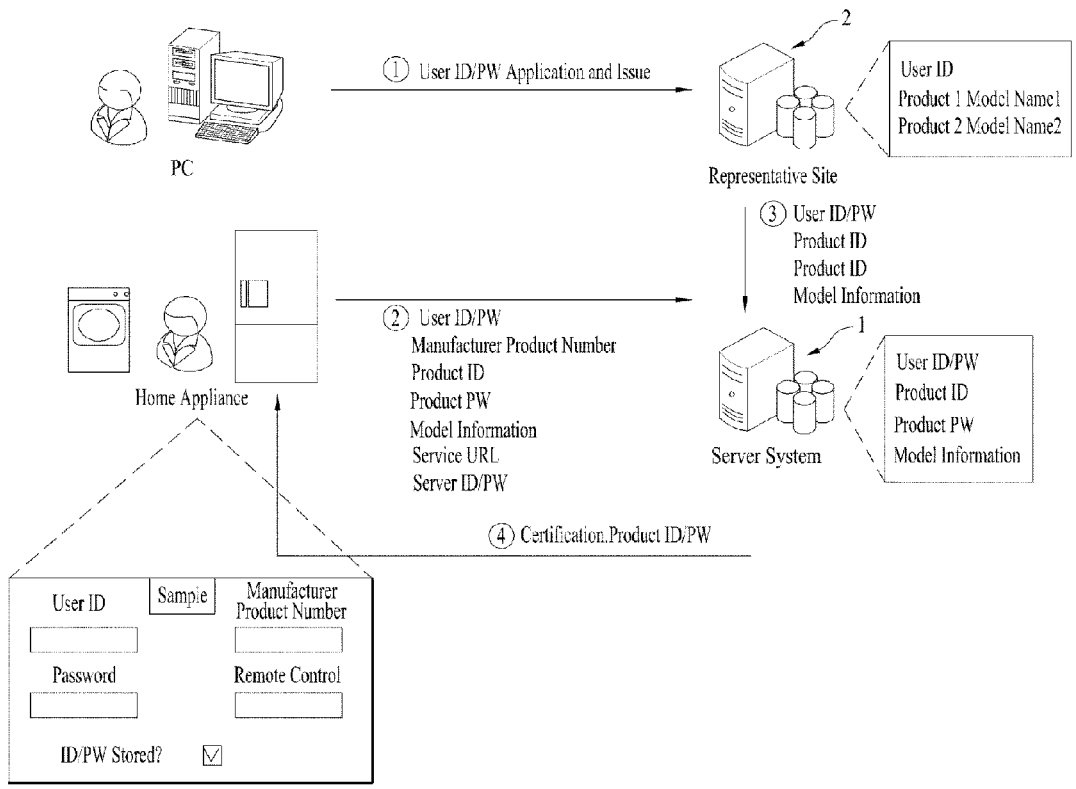
FIG. 3 illustrates a diagram showing a registration process of user information and home appliance information in the present invention.

FIG. 3 illustrates a diagram showing signup, and activation of the home appliance 100 or the wireless terminal 200.

As described before, the user accesses to the representative site 2, to signup thereto to have the ID and the password given to the user.

It may be said that the activation of the home appliance is a procedure for registering the home appliance 100 or the wireless terminal 200 of the user to the server system.

The display unit of the home appliance 100 or the wireless terminal 200 may have a window popped up thereto, which enables the user to input the user ID and password. The user may perform an activation procedure through the frame.

If the user inputs the user ID and password to the frame, and inputs an activation order, the home appliance 100 or the wireless terminal 200 transmits the user ID and password, the device ID, and the characteristic information of the product to the user site 2.

In this instance, the home appliance 100 or the wireless terminal 200 may have the user ID and password inputted thus stored in the memory unit thereof.

According to this, the user ID and password may be used for certification of the user.

The device ID may have been inputted to the home appliance 100 or the wireless terminal 200 already, or is generated inside of the home appliance 100 or the wireless terminal 200 automatically when the activation procedure is performed.

Or, it is possible that the device ID is generated automatically when the home appliance 100 or the wireless terminal 200 is newly bought and turned on for the first time.

As the characteristic information on the home appliance 100 or the wireless terminal 200, there may be model information, a product code, a manufactured date, a manufactured product number, and so on of the home appliance 100 or the wireless terminal 200.

And, in the activation procedure, the home appliance 100 or the wireless terminal 200 may transmit a password, a service URL, a server ID and password, altogether.

Of the information transmitted to the user site 2 in the activation procedure, the information excluding the user ID and password may be generated at the home appliance 100 or the wireless terminal 200 automatically, or in an already inputted state.

In the activation procedure, upon reception of the information described before at the user site from the home appliance 100 or the wireless terminal 200, the user site 2 registers the home appliance 100 or the wireless terminal 200 at the user ID.

According to this, the user site 2 has the home appliance 100 or the wireless terminal 200 the user uses registered at each user ID.

Then, the user site 2 transmits the user ID and password, the device ID, and the product characteristic information the server system 1. In this instance, the ID and the password of the server may be transmitted, altogether.

At first, the server system 1 performs certification on the information transmitted thus. Accordingly, when the certification is passed, the user ID and password, the device ID and password, and the product characteristic information are registered to the server system 1. In this instance, the device password may also be transmitted, altogether.

The activation procedure may be made regardless of place if a state of a communication environment is provided, in which access to the server system 1 and the user site 1 is possible. For an example, a seller from whom you have bought a product may perform the activation procedure for you.

The user may request the service at the display unit of the home appliance 100 or the wireless terminal 200 intended to have the service provided thereto.

For an example, after making a frame of a desired service to pop up on the display unit of the home appliance 100 or the wireless terminal 200, the service request may be made after inputting the user ID and password thereto.

In this instance, the home appliance 100 or the wireless terminal 200 may transmit the user ID and password, and the device ID, together with information on the service request.

Moreover, the user may request the desired service through the user site 2, too. The user site 2 may have a web page provided thereto for the user to request the management service thereto, and the user may also request the desired management service at the web page.

Upon reception of the service request from the user, the user site 2 may transmit information on the service request to the server system 1. In this instance, the user ID and password, and the device ID may be transmitted, altogether.

Moreover, the user may call a client call center to make the service request. The client call center may also be made to receive the management service with an ARS system.

In the meantime, the user can perform a procedure for cancelling or closing registration of the home appliance 100 or the wireless terminal 200 of his (or her) own registered thus.

Upon making a registration cancel or close frame to pop up at a screen of the home appliance 100 or the wireless terminal 200, if the user inputs a registration cancel or close order after inputting the user ID and password, the home appliance 100 or the wireless terminal 200 accesses to the representative site 2 or the server system 1 and transmits information on the registration cancel or close thereto.

And, according to this, the representative site 2 or the server system 1 cancels or closes registration of the home appliance 100 or the wireless terminal 200.

Moreover, the user may cancel signup to the representative site 2. Once, the user cancels signup, registration of the home appliance 100 or the wireless terminal 200 of the user is cancelled or closed.

Figure 4:
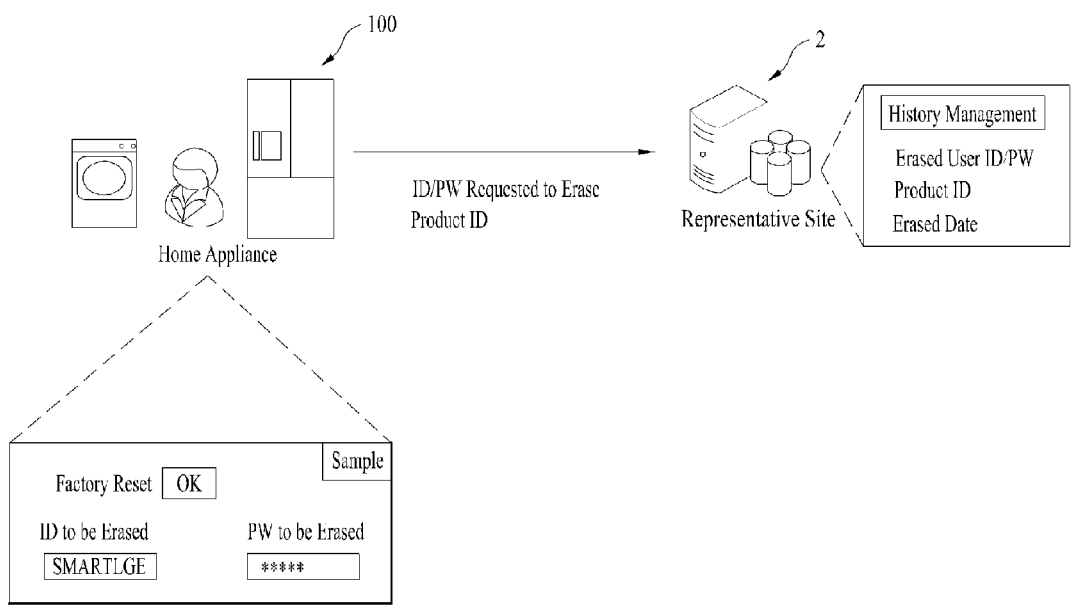
FIG. 4 illustrates a diagram showing an erasure process of user information and home appliance information in the present invention.

FIG. 4 illustrates a diagram showing a procedure for requesting erasure of the user ID and password of his (or her) own through the terminal.

Upon inputting the ID and password to be erased to the frame of the display unit of the home appliance 100 or the wireless terminal 200 and transmitting the same, the representative site 2 or the server system 1 may progress a procedure for cancelling or closing information on the member and registration of entire home appliance 100 or wireless terminal 200.

Figure 5:
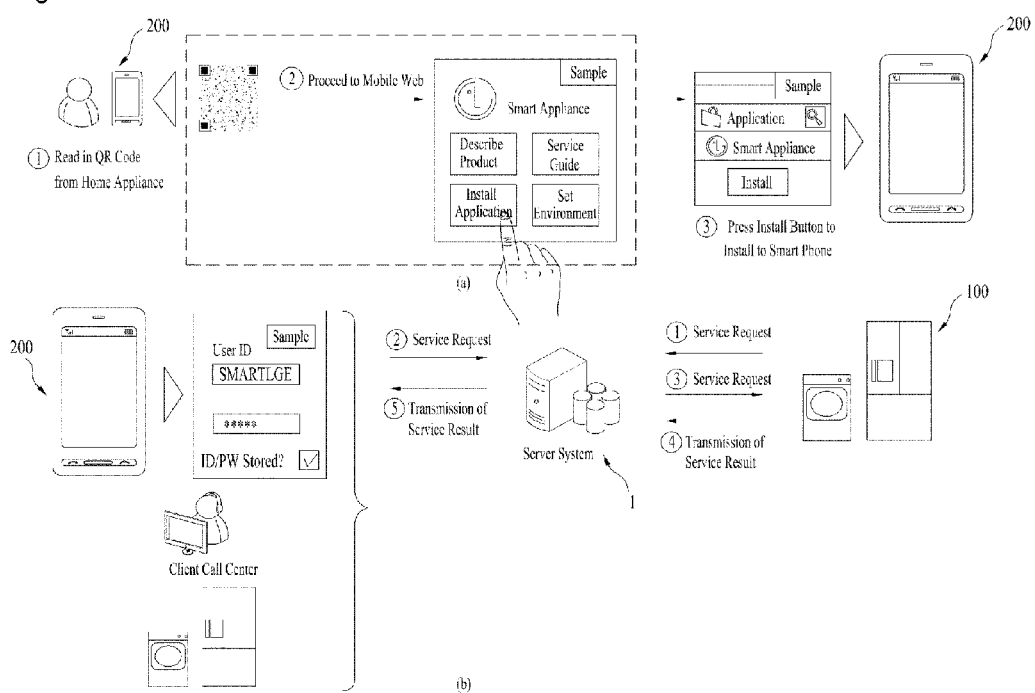
FIG. 5 illustrates a diagram showing installation of an exclusive application to a wireless terminal and receiving service accordingly in the present invention.

In the meantime, the service request may be made through the wireless terminal 1, like the smart phone. FIG. 5A illustrates a diagram showing downloading a smart phone application for management service.

When the user reads in a QR code attached to the home appliance by using the wireless terminal 200, a mobile web is displayed on the screen of the wireless terminal 200. And, upon pressing an application installation button of buttons shown on the mobile web, a frame related to an application installation is displayed.

And, upon pressing an install button, the application is installed to the wireless terminal 200.

In this instance, the application is an interface which enables to access to the server system 1, and, with this, the user can manage the home appliance by using the smart phone, remotely.

FIG. 5B illustrates a diagram showing service request through the wireless terminal 200, the client call center, and the home appliance 100 (A washing machine and a refrigerator are shown as the home appliance, as an example).

If the service request is made through the home appliance 100, the user may input the user ID and password by using the input unit displayed on the display unit of the home appliance 100 to request the service (A case of ①).

If the service request is made through the home appliance 100, the server system 200 performs service (Provision of information, and fault diagnosis) the home appliance 100 requires (A case of ③), and the home appliance 100 transmits a result of the service in a direction of the server system (A case of ④).

If the service request is made though the home wireless terminal 200, the user may start the management service application installed to the wireless terminal 200, and request the service on the home appliance by inputting the user ID and password (A case of ②).

For requesting the service, the wireless terminal 200 may transmit information on the service request to the server system 1, together with the user ID and password, and the device ID.

The server system 1 performs the service (Provision of information, and diagnosis of fault) the home appliance 100 requires (A case of ③), and the home appliance 100 transmits a result of the service in a direction of the server system 1 (A case of ⑤).

An embodiment of information or signal exchange between the home appliance 100 and the server system 1 in an information management system for a home appliance illustrated in FIGS. 1 and 2 will be described.

As a precondition for the information exchange between the home appliance 100 and the server system 1, a certification procedure between the server system 1 and the home appliance 100 is required.

If the home appliance 100 accesses to the server system 1, the server system 1 requires certification of the home appliance 100, and the user handles the input unit of the home appliance 100 to input information required for the certification (The user ID and password, and other certification number) to have the certification done.

In the present invention, by the information or signal inputted through the input unit of the wireless terminal 200, the home appliance 100 may be remotely controlled, or state information of the home appliance 100 may be displayed on the display unit of the wireless terminal 200.

Figure 6:
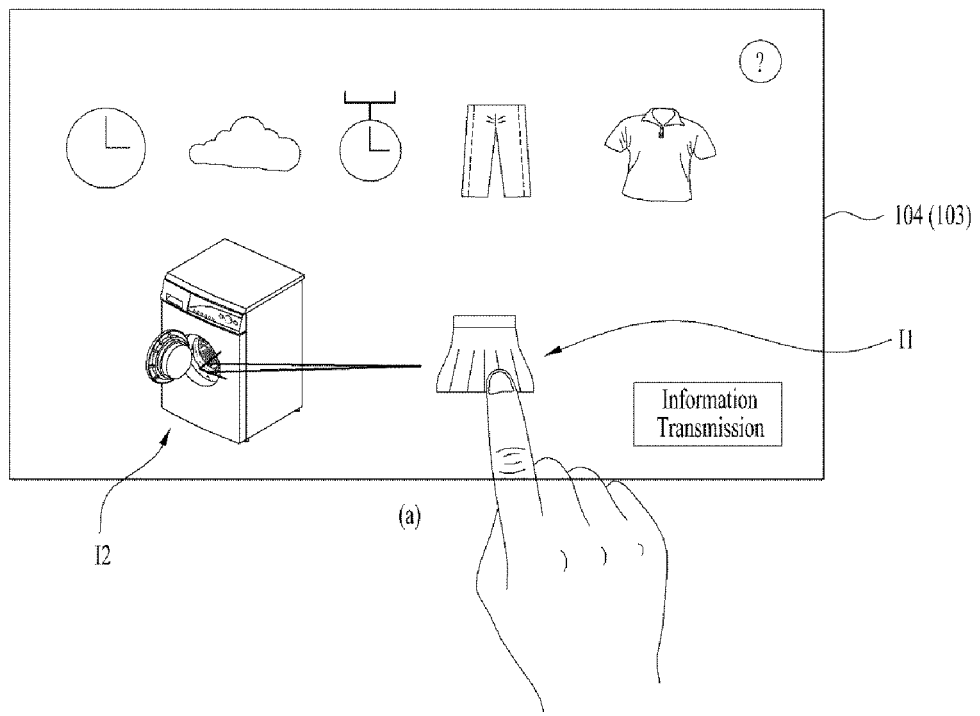
FIG. 6 illustrates a diagram showing a situation in which a washing course is recommended by using a laundry icon at a washing machine in the present invention.
Figure 6:
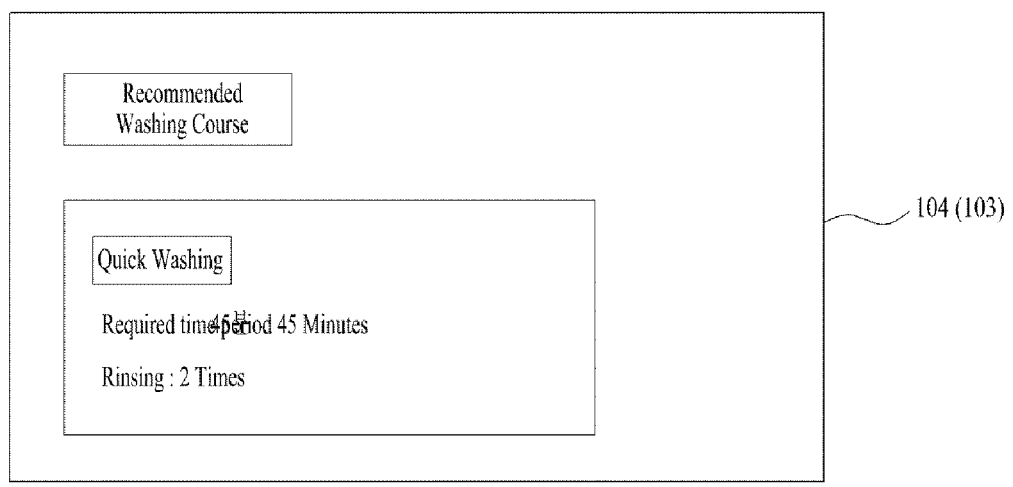

FIG. 6 illustrates a diagram showing that the server system recommends a washing course in a case the user provides information on a present washing object by using touch panel shapes of the display unit 104 and the input unit 103 provided to the washing machine, if the home appliance 100 is the washing machine.

In the information management system of the present invention, if there is information request on operation of the home appliance 100 through the input unit 103 of the home appliance 100, the information is provided through the server system 1.

That is, the server system 1 transmits the information having a operation condition of the home appliance 100 inputted through the input unit 103 taken into account to the home appliance 100, and the information is displayed on the display unit 104.

That is, by transmitting laundry information to the server system 1, a washing course proper to the laundry may be recommended, or by taking a user's taste or food material into account, a recipe or so on may be provided.

The following situation may be described as one of embodiments of information exchange between the washing machine and the server system 1.

Referring to FIG. 6A, after certification is made between the washing machine and the server system, if the user drags one of laundries displayed in forms of icons and drops the laundry at a virtual model of the washing machine, and inputs a 'information transmission' button, the information on the laundry is transmitted to the server system.

Then, as shown in FIG. 6B, if a washing course is recommended by the server system 1, the washing course recommended thus is displayed on the display unit 104, and it is preferable that the recommended washing course indicates detailed required time period, a major cycle, and so on.

Figure 7:
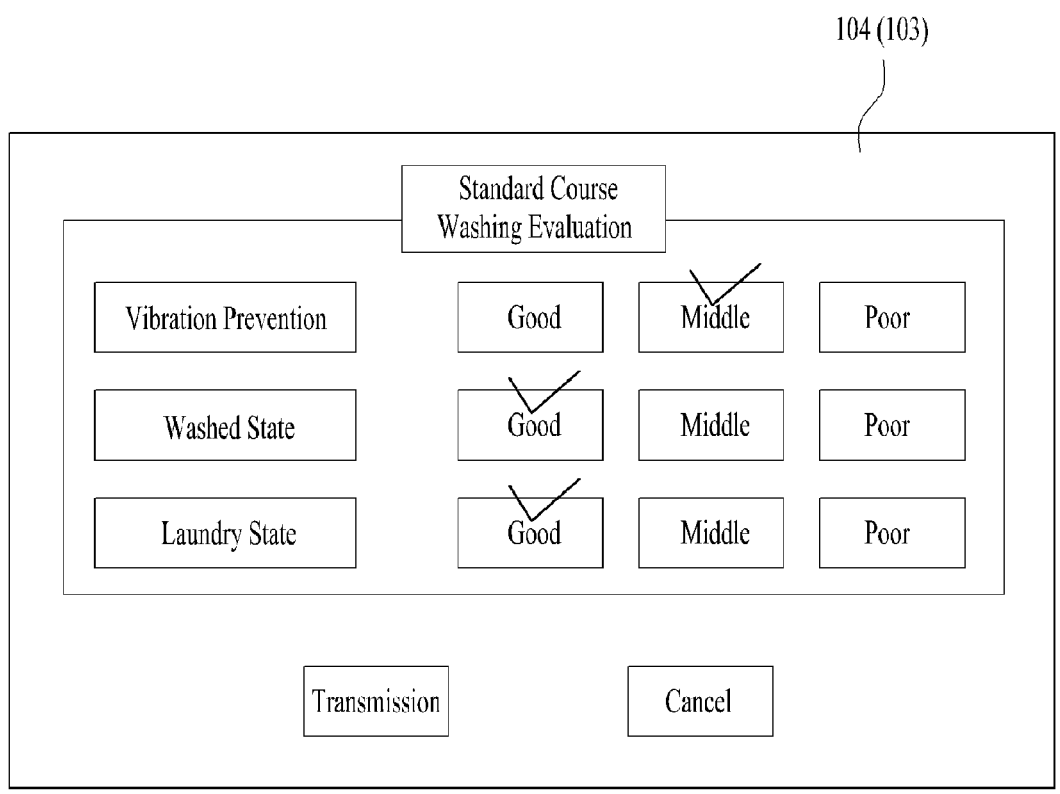
FIG. 7 illustrates a diagram showing a situation in which evaluation on a washing course is made in the present invention.

In the meantime, if the washing is performed according to the recommended washing course as shown in FIG. 6, the display unit 104 of the washing machine has a window popped up thereon as shown in FIG. 7 for evaluation of the recommended washing course.

By selecting items related to the evaluation of the recommended washing course, the user can evaluate the recommended washing course, and upon pressing a transmission button, the evaluation of the user is transmitted to the server system 1.

The user's evaluation transmitted thus becomes a feed back to the server system 1 to help modification or improvement of a specification of the washing course evaluated thus.

Figure 8:
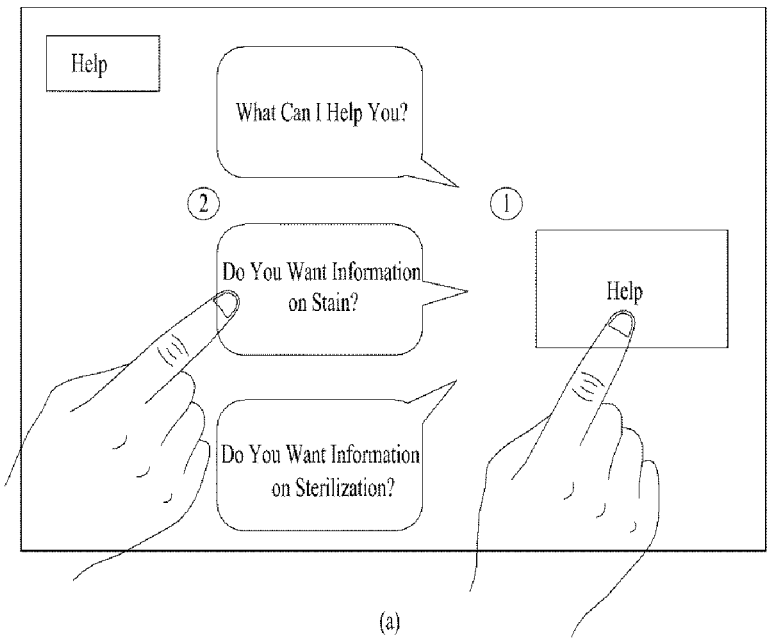
FIGS. 8 and 9 illustrate diagrams each having washing information recommendation upon selection of a kind of stain in the present invention.
Figure 8:
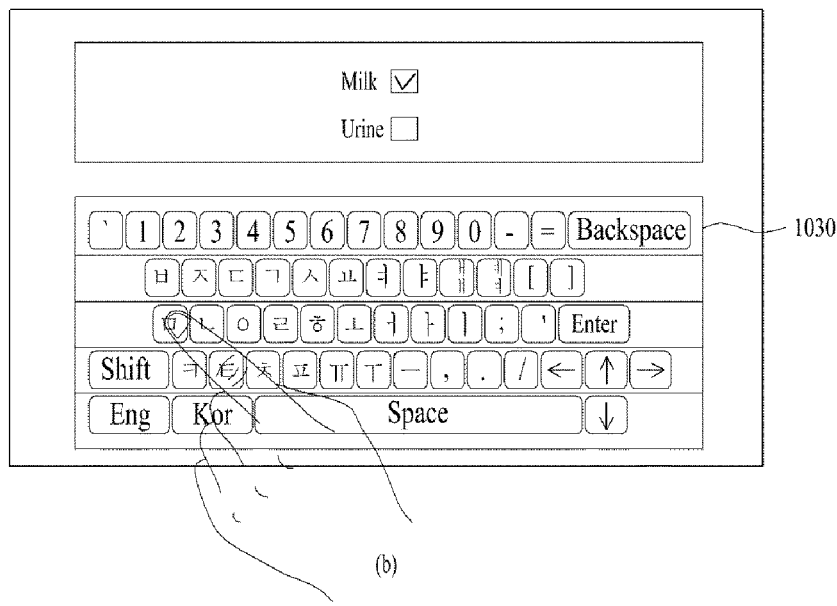
Figure 9:
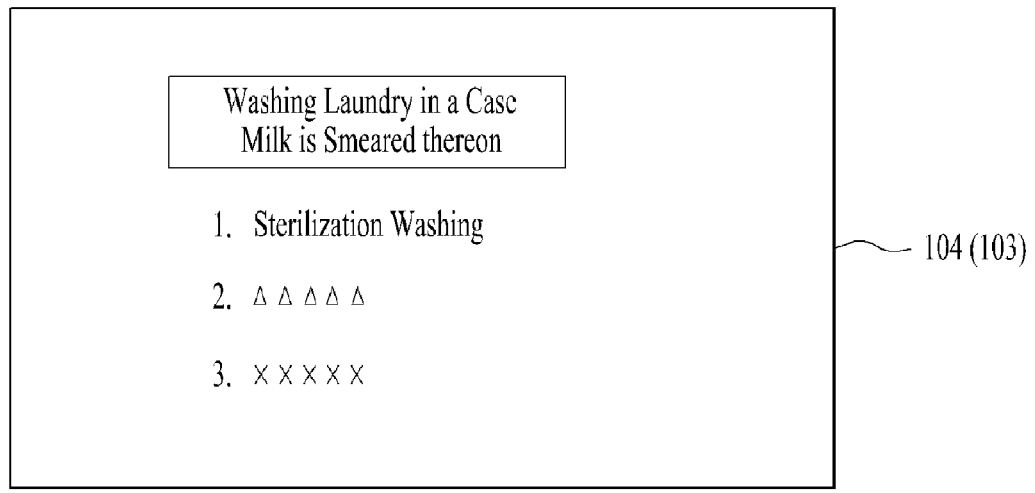
Figure 9:
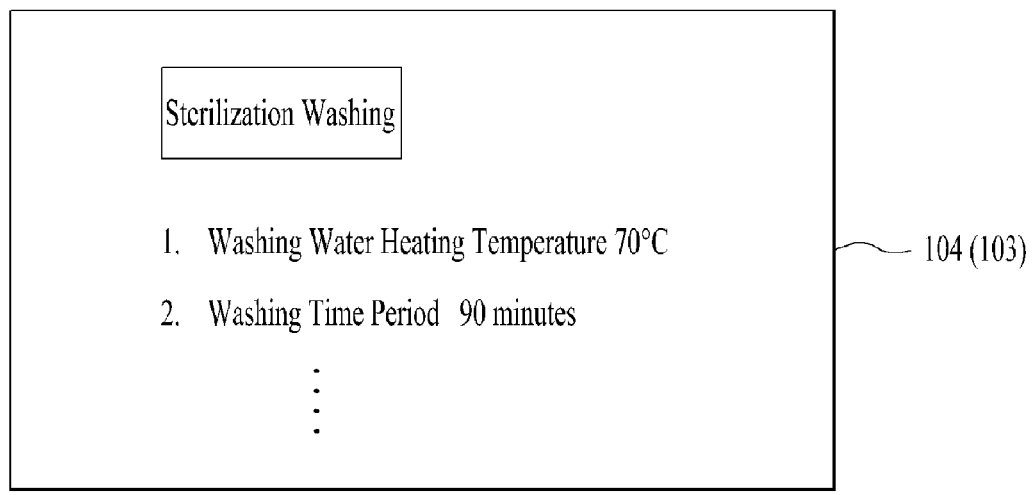

In the meantime, FIGS. 8 and 9 illustrate diagrams of embodiments in which the server system 1 provides information according to predetermined information inputted through the input unit 103 of the home appliance 100, respectively.

Herein too, typically, FIGS. 8 and 9 illustrate that a washing machine has washing information recommended thereto.

Referring to FIG. 8A, if the user presses 'Help' at the display unit 104, different phrases are displayed. If the user touches a particular phrase, a frame changes as shown in FIG. 8B, and the user can input words related to service the phrase can provide.

That is, referring to FIG. 8A, if the user desires to have information on stain or foreign matter stuck to the laundry provided thereto, as shown in FIG. 8B, a key board 1030 is displayed for the user to input kinds of the stain or the foreign matter the user desires to know if the user touches the phrase.

By inputting a kind of the stain or the foreign matter by using the key board 1030 and pressing an 'enter' button, the information the user inputted is transmitted to the server system 1.

And, referring to FIG. 9A, the server system 1 selects a washing method for removing the stain or the foreign matter the user inputted and transmits the washing method to the washing machine, to provide a plurality of washing methods at the display unit 104 of the washing machine, in a form of recommendations.

And, referring to FIG. 9B, if the user selects one of the washing methods recommended thus, detailed specification of the washing machine selected and touched thus is displayed at the display unit 104 of the washing machine.

Figure 10:
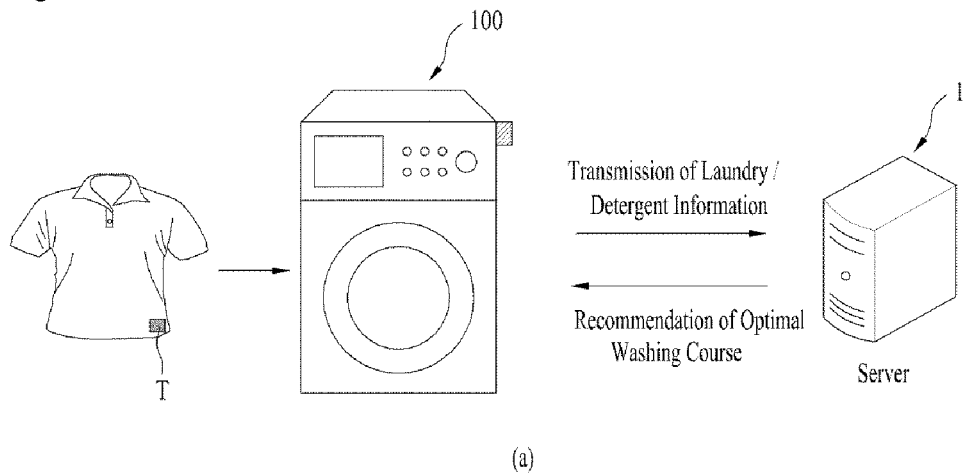
FIG. 10 illustrates a diagram having a washing course recommendation by using a tag to laundry in the present invention.
Figure 10:
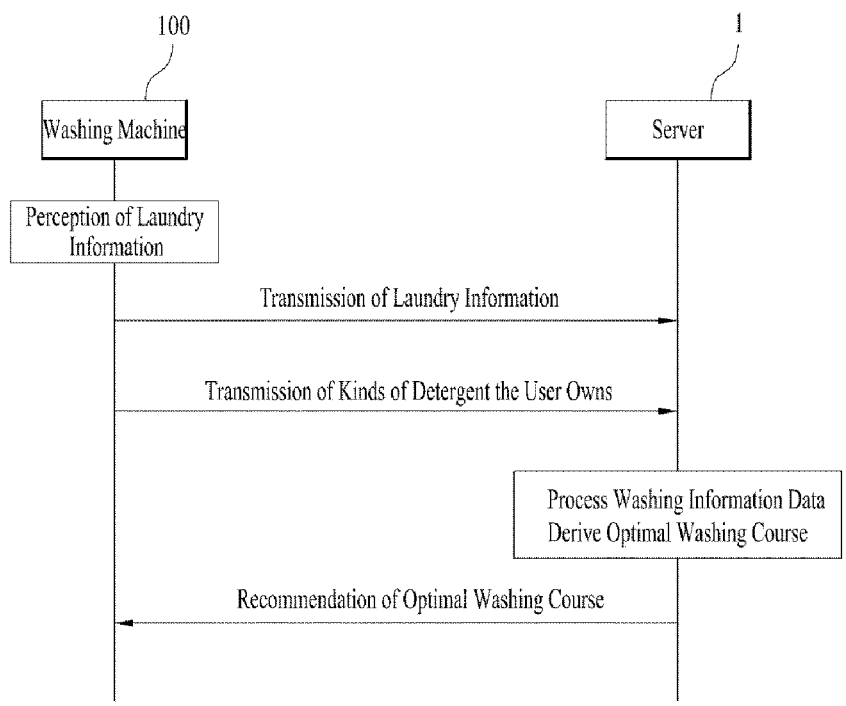

Referring to FIG. 10, if the user makes a tag T to the laundry to be read at a reader R provided to the washing machine, laundry information is collected by the washing machine.

And, if the user transmits laundry information and detergent information the user owns presently to the server system 1, the server system 1 processes washing information data to derive an optimal washing course by using the laundry information and the detergent information.

Then, the server system 1 recommends the optimal washing course and transmits the same to the washing machine. And, the optimal washing course is displayed at the washing machine for the user to perceive the optimal washing course, easily.

Figure 11:
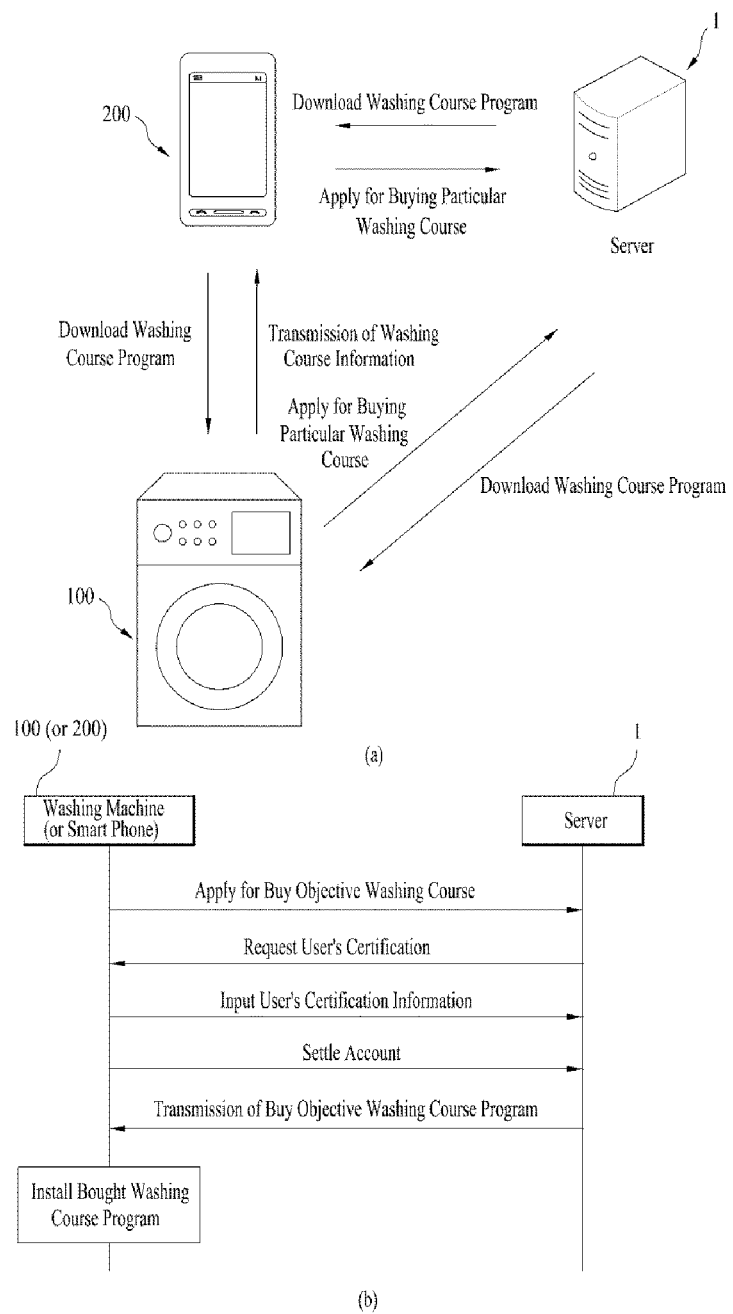
FIG. 11 illustrates a diagram showing a situation in which a particular washing course is bought in the present invention.

FIG. 11 illustrates a diagram showing the steps of user's application of buying a newly developed washing course program by using the wireless terminal 200, such as smart phone, or the washing machine 100 itself, downloading the washing course program, and installing the washing course program to the washing machine.

At first, when the user applies a buy objective washing course by using the washing machine 100 or the wireless terminal 200, the server system 1 requests user's certification on the washing machine 100 or the wireless terminal 200.

According to this, the user inputs user certification information by inputting the user ID and password, and settles accounts. If the account is settled, the server system 1 transmits the washing course program requested to buy toward the wireless terminal 200 or the home appliance 100, and the washing course is downloaded on the washing machine.

And, the user may install the washing course bought thus according to an installation manual of the program.

In the meantime, in the present invention, the user may perceive the QR code or the bar code with the wireless terminal 200 to obtain information, and transmit the information to the home appliance 100 directly, or may obtain other information by using the server system 1 and transmit the information to the home appliance 100.

Figure 12:
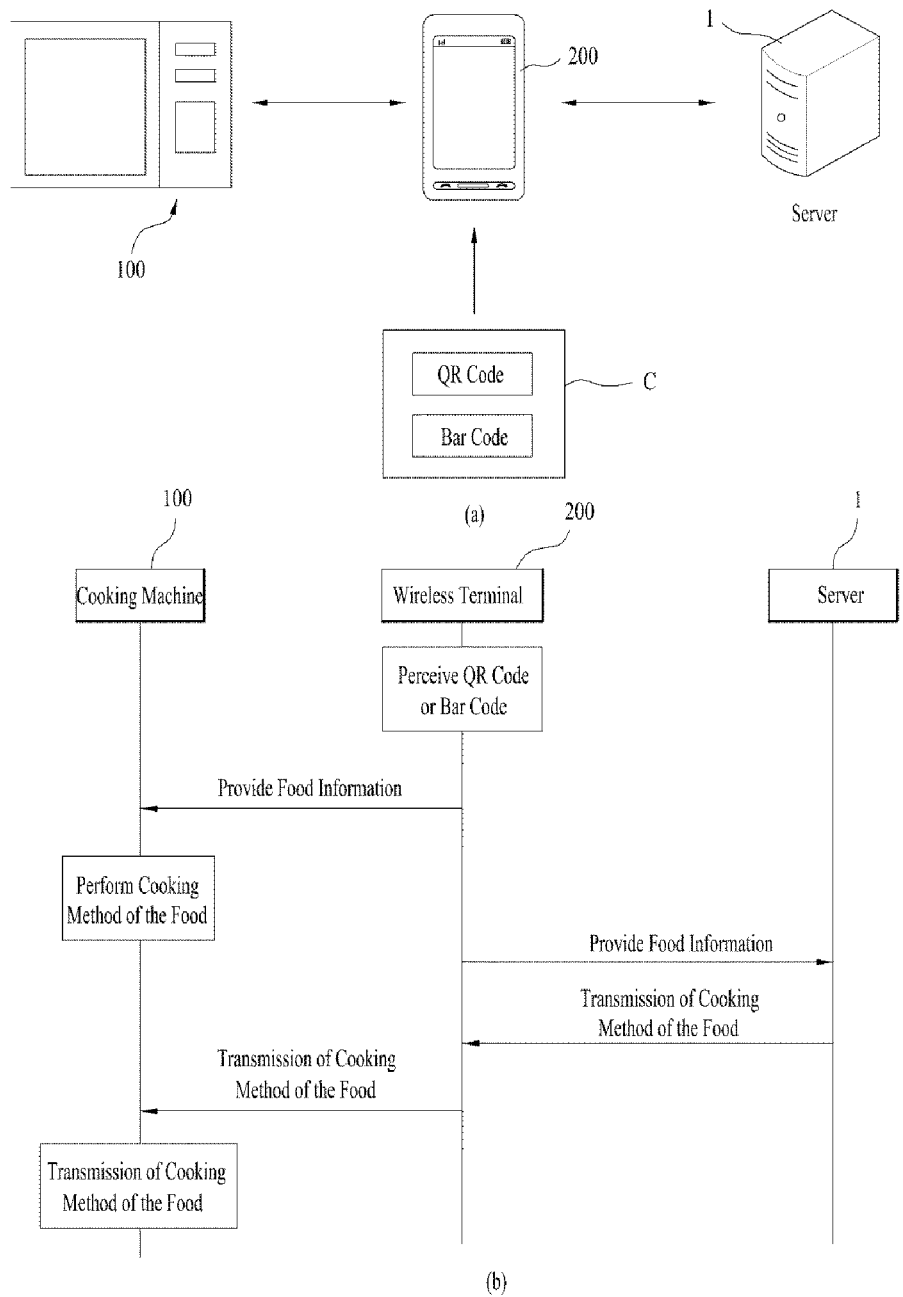
FIG. 12 illustrates a diagram showing a state in which a food cooking method is provided from a server system by using a QR code or a Bar code in the present invention.

As an embodiment on this, FIG. 12 illustrates a diagram showing a method in which the user reads in the QR code or the bar code C indicated on a package of food by using the wireless terminal 200, provides cooking information on the food to a cooking machine 100 directly, or to the server system 1 to have a cooking method of the food provided the cooking machine 100 from the server system 1.

If the user reads in the QR code or the bar code C from a package of food by using the wireless terminal 200, composition information or a cooking method is displayed on the wireless terminal 200, the user transmits the information to the cooking machine 100, and the cooking machine 100 may cook the food according to the cooking method.

On the other hand, if the user reads in the QR code or the bar code C from the food package by using the wireless terminal 200, and transmits the same to the server system 1, the server system 1 finds out information on the cooking method of the food and transmits the same toward the wireless terminal 200.

And, the user may transmit the information on the cooking method of the food received thus toward the cooking machine 100, and may put the cooking machine 100 into operation to cook the food according to the cooking method of the food.

In the meantime, the present invention enables diagnosis of a fault or an error of the home appliance 100 by means of communication between the home appliance 100 and the server system 1, and, moreover, the wireless terminal 200 of a service center engineer and the server system 1 may be connected to a service object home appliance 100 for transmission of a result of error diagnosis and tuning a service visit schedule.

Figure 13:
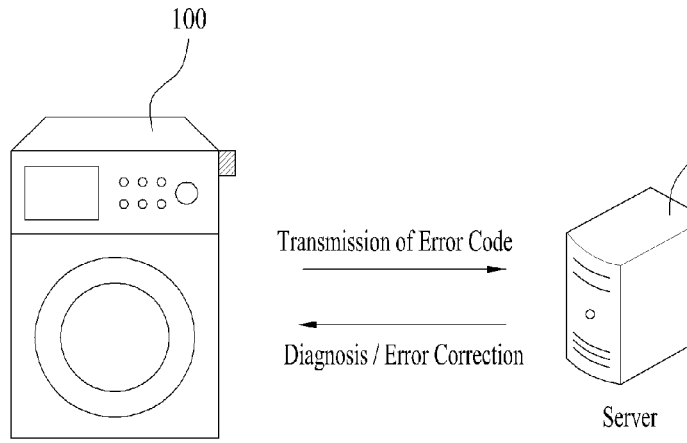
FIG. 13 illustrates a diagram showing remote diagnosis and reception of a fault when a home appliance is in fault in the present invention.
Figure 13:
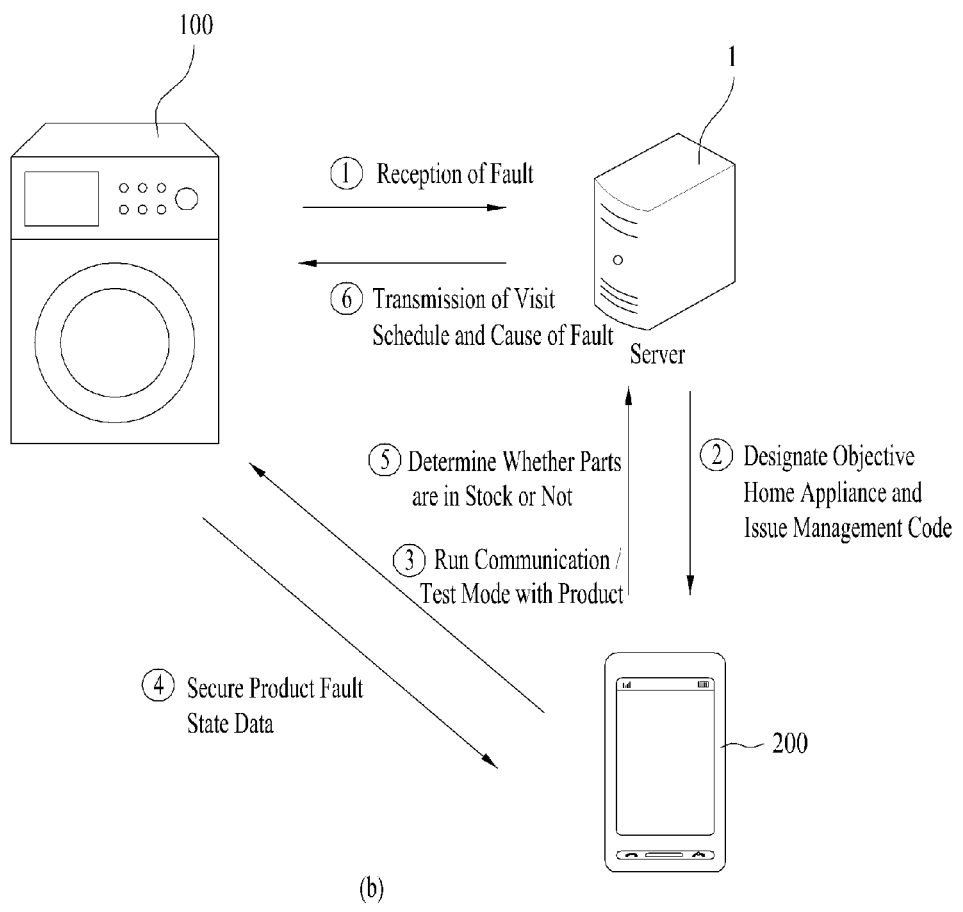

That is, referring to FIG. 13A, if an error takes place in middle of operation of the home appliance 100, an error code on the error is displayed on the display unit of the home appliance 100, and the home appliance 100 transmits the error code to the server system.

Basically, the home appliance 100 has a self-diagnosis program installed thereto, to enable the home appliance 100 to inform to the server system if the error takes place.

The server system 1 analyzes the error code, to diagnose a cause of the error, provides a solution for correcting the error, transmits the cause of the error and a method for correcting the error to the home appliance 100, and displays the same on the display unit of the home appliance 100.

In the meantime, FIG. 13B illustrates a diagram showing a situation in which the wireless terminal 200 of the service center engineer, the server system 1, and the home appliance 100 are connected.

If the error is find out by the self-diagnosis program of the home appliance 100, and received at the server system 1 automatically (①), the server system 1 transmits a diagnosis object home appliance designation and a management code to the wireless terminal 200 of the service center engineer (②).

According to this, the service center engineer communicates with the home appliance 100 which is the diagnosis object by using the wireless terminal 200 of his own, to put the home appliance 100 into a fault diagnosis mode (③).

Then, the service center engineer secures (④) data on a fault state of the product, determines whether required parts are in stock or not through the server system 1 (⑤). And, if a state the parts are in stock is determined, the service center engineer transmits (⑥) matters related to a visit schedule of the service center engineer, and the cause of the fault to the home appliance 100.

Figure 14:
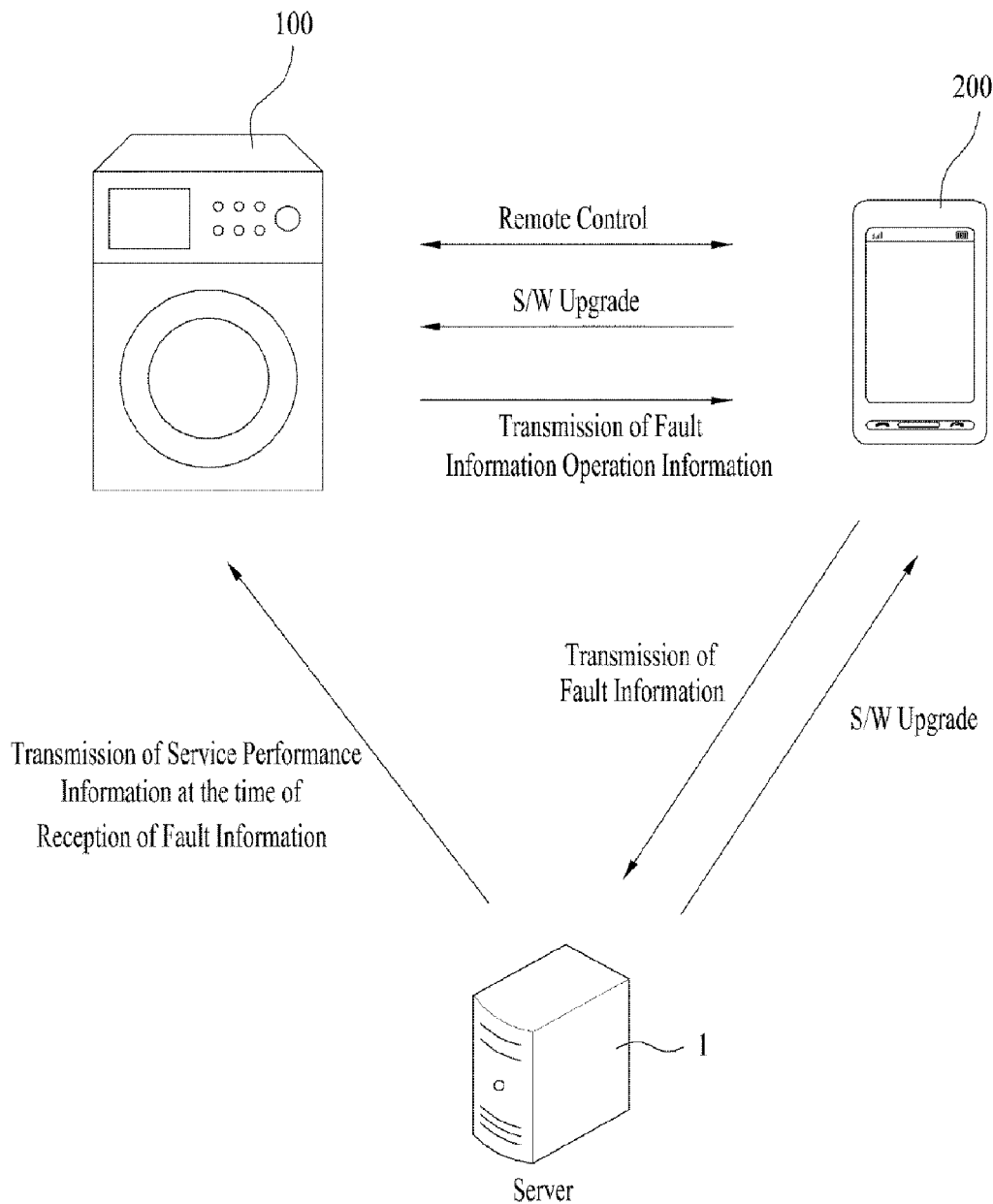
FIG. 14 illustrates a diagram showing a state in which software of a home appliance is upgraded after reception of fault information on the home appliance in the present invention.

FIG. 14 illustrates a diagram showing possibility of transmission/reception of a necessary program, fault information, or operation information by using communication among the home appliance 100, the wireless terminal 200 of the user, and the server system 1.

At first, the user can control the home appliance 100 by using the wireless terminal 200, remotely.

In the meantime, if firmware or other software is upgraded, the server system 1 transmits the upgraded firmware or software to the wireless terminal 200 of the user.

The firmware or software transmitted to the wireless terminal 200 is, in turn, transmitted toward the home appliance 100, and, according to this, the firmware or software of the home appliance 100 is upgraded.

In the meantime, the home appliance 100, having the self-diagnosis program installed thereto, can transmit the operation information or the fault information to the wireless terminal 200 in real time, and the user can provide the fault information or the operation information received at the wireless terminal 200 toward the server system 1.

Upon reception of the fault information, the server system 1 transmits service performing information to the home appliance 100 or the wireless terminal 200, specifically, a visit schedule of a service engineer or detail of the service.

In the meantime, the present invention enables to set (Setting pairing) a language and a power company used in a place the home appliance 100 is installed thereto, automatically.

Figure 15:
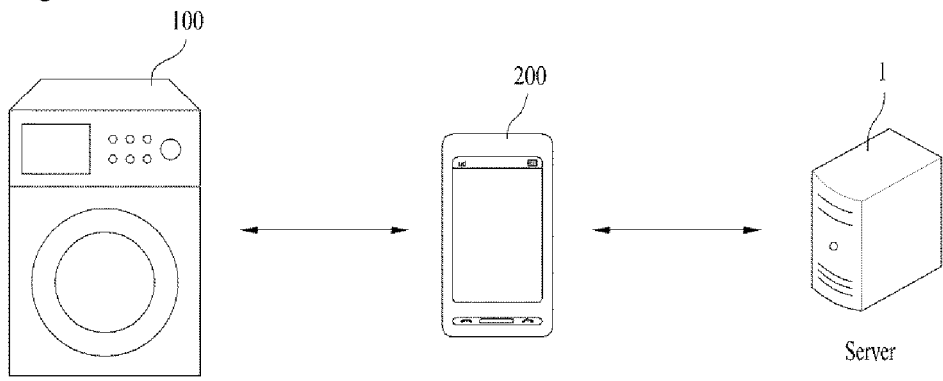
FIG. 15 illustrates a diagram showing home appliance pairing in the present invention.
Figure 15:
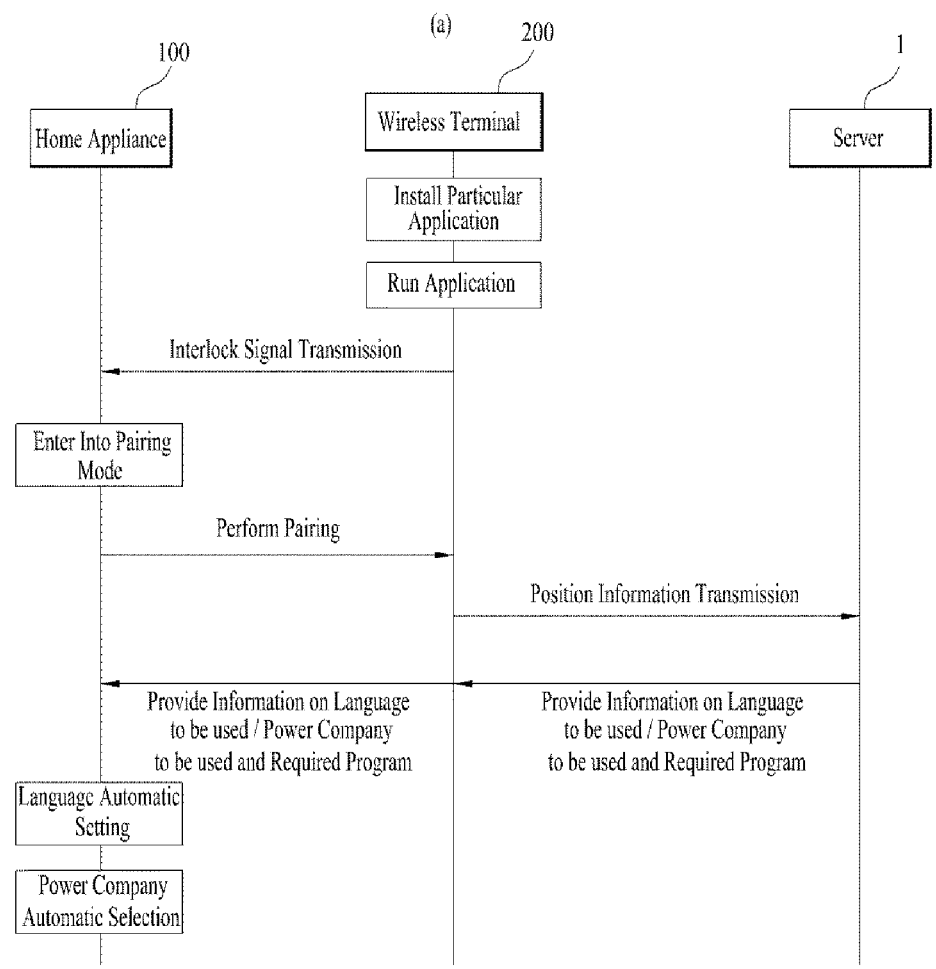

That is, referring to FIG. 15, in a state the wireless terminal 200, such as the smart phone, is in communication with the home appliance and the server system, an application is installed to the wireless terminal 200 for performing the pairing.

And, if the user runs the application, the wireless terminal 200 transmits an interlock signal to the home appliance 100. Upon reception of the interlock signal, the home appliance 100 enters into a pairing mode to perform the pairing.

Information on the home appliance 100 entered into the pairing mode is transmitted to the wireless terminal 200, and the wireless terminal 200 notifies the server system of position information on the home appliance 100.

The server system 1 provides a language used at a place the home appliance 100 is installed thereto, the power company information, and other necessary program to the wireless terminal 200.

The wireless terminal 200 having the information and the program downloaded thereon thus transmits the same to the home appliance 100, and the home appliance 100 sets the language to be used automatically, and selects and sets the power company automatically, to enable to use power.

Figure 16:
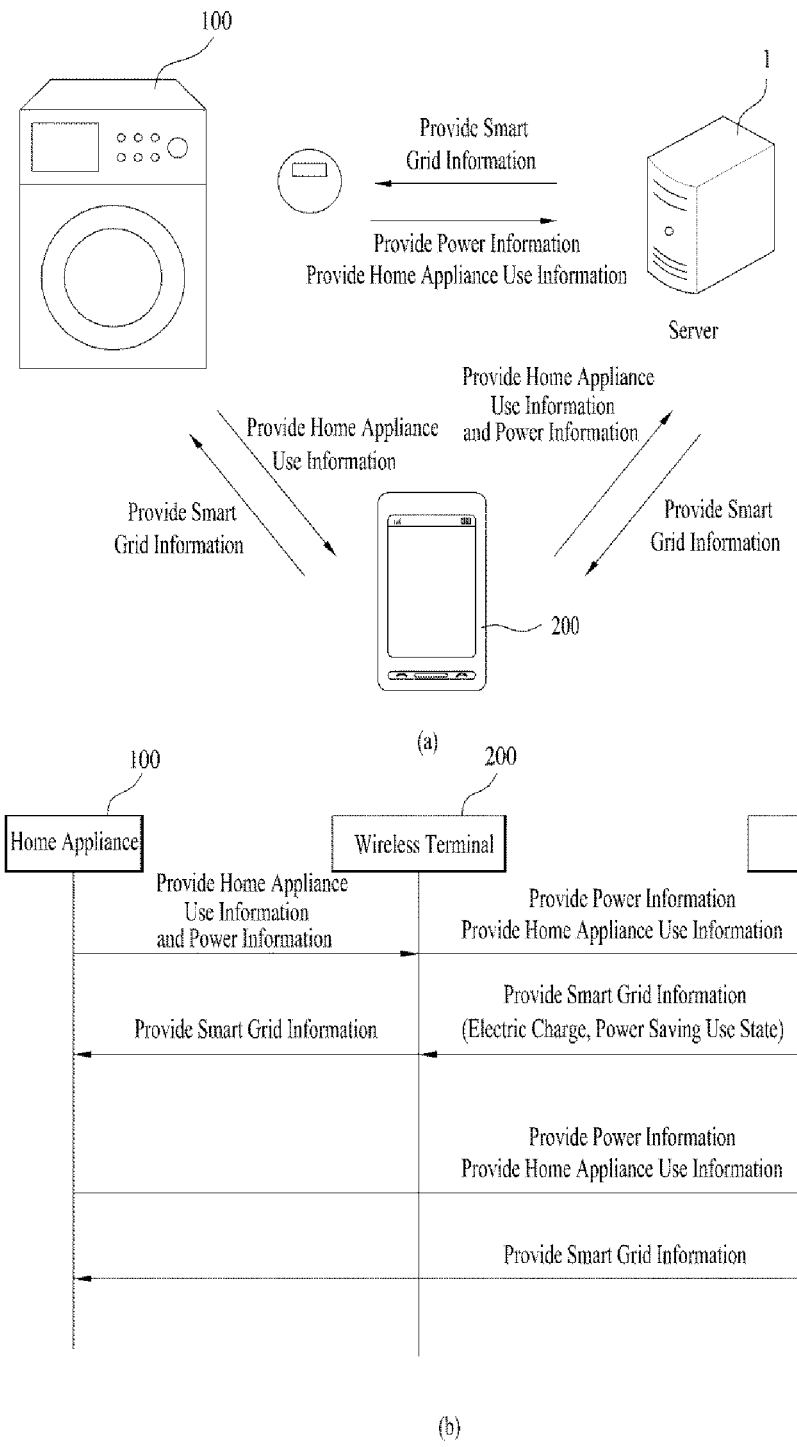
FIG. 16 illustrates a diagram showing transmission/reception of smart grid information in the present invention.

FIG. 16 illustrates a diagram of an embodiment in which smart grid information is provided among the home appliance 100, the wireless terminal 200, and the server system 1.

In the embodiment, if the input unit of the home appliance 100 requests power information for operation the home appliance 100, the server system 1 provides power information recommendation related to a operation environment of the home appliance 100, and the power information recommended thus may be indicated on the display unit.

In this instance, the smart grid information relates to information on controlling used wattage taking an electric charge under a variable electric rate system into account.

The smart grid information may be transmitted between the server system 1 the home appliance 100, and among the server system 1—the wireless terminal 200—the home appliance 100.

In a case of information exchange between the server system 1 the home appliance 100, in a state a program related to collection of power use information is installed to the home appliance 100, the home appliance 100 collects use information on the home appliance 100 (An operation time period, and operation type the user prefers), power information on the home appliance 100, and so on by using the program, and transmits the information collected thus to the server system 1.

In this case, the server system 1 may transmit information on the electric charge of home appliance 100 toward the home appliance 100, or optimal operation information for saving the electric charge taking a use pattern or used wattage of the home appliance 100 into account, or smart grid information, such as saving operation information which can save used wattage and so on to the home appliance 100.

In the case of information exchange among the server system 1, the wireless terminal 200, and the home appliance 100, in a state the program related to collection of power use information is installed to the home appliance 100, the home appliance 100 collects use information on the home appliance 100 (An operation time period, and operation type the user prefers), power information on the home appliance 100, and so on by using the program, and transmits the information collected thus to the wireless terminal 200.

The wireless terminal 200 transmits the information received thus to the server system 1.

In this case, the server system may transmit information on the electric charge of the home appliance 100 toward the wireless terminal 200, or optimal operation information for saving the electric charge taking a use pattern or used wattage of the home appliance 100 into account, or smart grid information, such as saving operation information which can save the used wattage and so on to the home appliance 100.

And, the wireless terminal 200 may transmit the smart grid information received from the server system 1 toward the home appliance 100, for supporting the home appliance 100 to operate with reference to the smart grid information.

Figure 17:
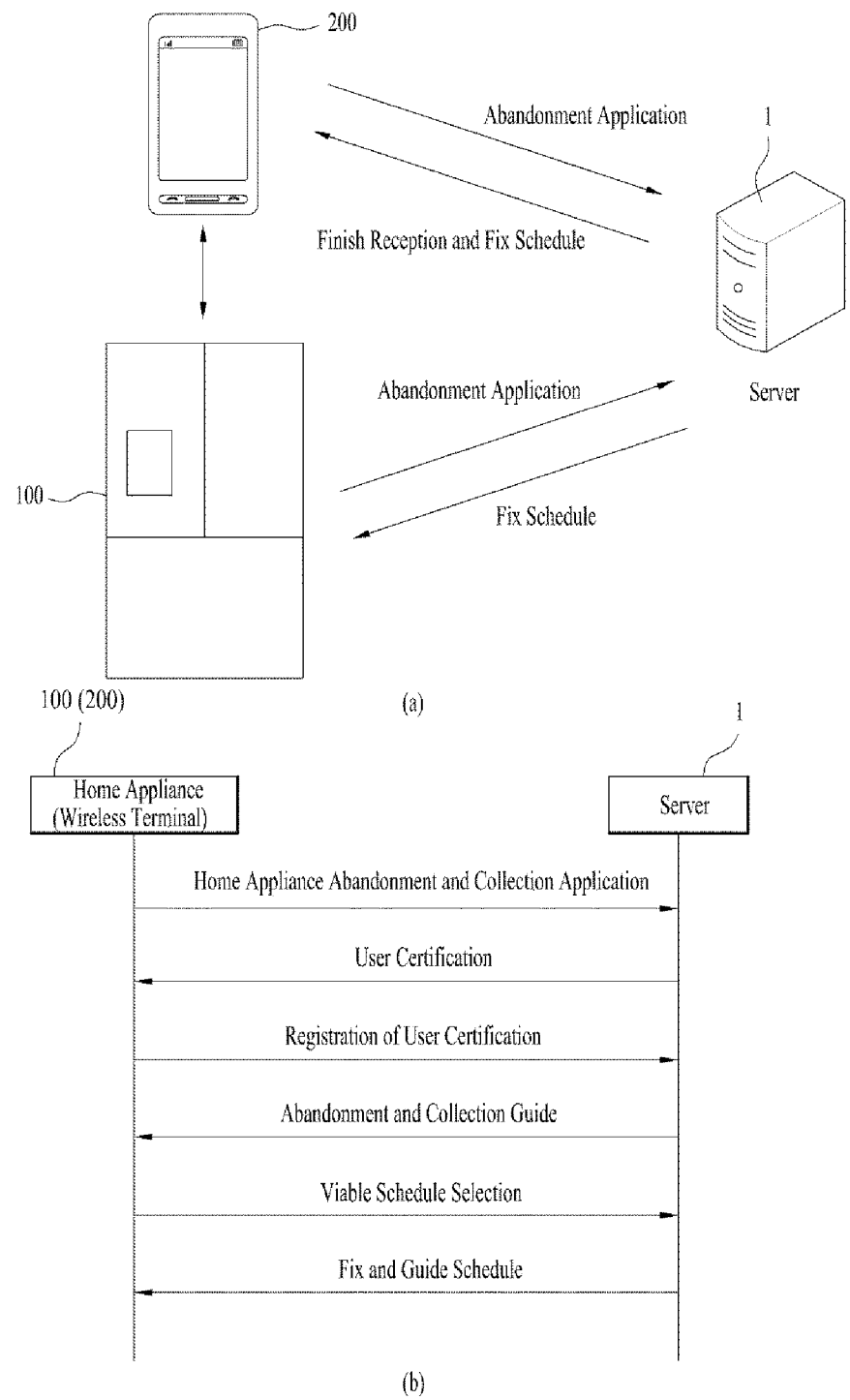
FIG. 17 illustrates a diagram of making abandoning and collection application of a home appliance in the present invention.

FIG. 17 illustrates a diagram showing an embodiment for a manufacturer to collect the home appliances 100 to be abandoned by using the present invention.

In a state the user is in communication with the server system 1 through the home appliance 100 or the wireless terminal 200, the user applies for abandonment or collection of the home appliance 100 to the manufacturer which manages the server system 1 by using the input unit of the home appliance 100 or the wireless terminal 200.

The server system 1 requests user's certification, and the user inputs the user ID and password in response to the request to perform user certification registration.

And, the server system 1 provides guide information on the abandonment and collection, and the user selects a viable schedule by using the input unit of the home appliance 100 or the wireless terminal 200 taking the information guided thus into account.

And, when the schedule is selected, the server system 1 may fix the collection schedule and provide guide information required for the collection.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An information management system for a home appliance, comprising:
    a home appliance having a predetermined ID;
    a server system having the ID of the home appliance recorded thereon, the server system provided to communicate with the home appliance for transmitting and receiving predetermined information with the home appliance upon request from the home appliance with the ID recorded thereon, already, wherein the home appliance includes an input unit for inputting a predetermined order thereto, a display unit for displaying predetermined information, a communication unit for performing communication with the server system, and a controller for controlling the input unit, the display unit and the communication unit, and wherein, if there is request for information on performance of a function of the home appliance from the input unit, the server system searches and transmits the information on the performance of the function, and the information is displayed on the display unit; and
    a wireless terminal having an application installed thereto for managing power information on the home appliance, the wireless terminal connected to the home appliance and the server system to be able to communicate therewith,
    wherein, if there is request for power information to drive the home appliance from the input unit of the wireless terminal, the server system provides recommendable power information on a drive environment of the home appliance, and the power information recommended thus is displayed on each of the display units of the wireless terminal and the home appliance, and
    wherein, if the user runs the application at the wireless terminal, the wireless terminal transmits an interlock signal to the home appliance, and, upon reception of the interlock signal, the home appliance enters into a pairing mode for setting a language of a place, and setting a power company the home appliance is installed thereto, and, if the wireless terminal transmits position information on the home appliance to the server system, the server system provides the language to be used, power company information to be used, and a set program toward the home appliance.

2. The information management system as claimed in claim 1, wherein the communication unit transmits/receives the information after passing through a mutual certification process with the server system.

3. The information management system as claimed in claim 1, wherein, if there is request for information on operation of the home appliance from the input unit, the server system transmits the information taking an operation condition of the home appliance received through the input unit into account, and the information is displayed on the display unit.

4. The information management system as claimed in claim 3, wherein the home appliance is a washing machine, wherein, in a state a plurality kinds of laundry mark icons and a washing machine mark icon are displayed on the display unit of the washing machine, if the user drags one of the laundry mark icons, drops the laundry mark icon at the washing machine mark icon, and makes information transmission to the server system, the server system transmits recommended washing course information for washing the laundry related to the dragged and dropped laundry mark icon to display the recommended washing course information received from the server system on the display unit of the washing machine.

5. The information management system as claimed in claim 4, wherein, if the recommended washing course is preformed and finished, a popup window including washing course evaluation items is displayed on the display unit, and the user inputs evaluation points to the popup window and transmits the evaluation points to the server system.

6. The information management system as claimed in claim 5, wherein, if there is an abnormal operation cause diagnosis request on the home appliance from the input unit, the server system performs the abnormal operation cause diagnosis or provides service schedule information, and displays diagnosis result information or service schedule information on the display unit.

7. The information management system as claimed in claim 1, wherein, if there is request for information on operation of the home appliance from the input unit, the server system transmits the information taking an operation condition of the home appliance received through the input unit into account, and the information is displayed on the display unit.

8. The information management system as claimed in claim 1, wherein, if the language to be used, and the power company information to be used, and the set program are downloaded from the server system, the home appliance selects and sets the language to be used, and the power company to be used, automatically.

9. The information management system as claimed in claim 1, wherein, if there is firmware or software update request related to the home appliance from the controller automatically, or from the input unit, the server system transmits a firmware or software update file the home appliance requires, and the controller runs the firmware or software update file received thus.

10. The information management system as claimed in claim 1, wherein, if there is application for abandonment or close of the home appliance to the server system from the home appliance or the wireless terminal, the server system transmits a collection and abandonment guide schedule, fixes the schedule if the user selects a viable schedule, and transmits the schedule to the home appliance or the wireless terminal.

* * * * *